Sept. 23, 1958 R. D. RIVERS 2,853,154
POCKET-TYPE AIR FILTERS
Filed Aug. 27, 1956

INVENTOR.
RICHARD D. RIVERS
BY
Arthur J Robert
ATTORNEY

United States Patent Office 2,853,154
Patented Sept. 23, 1958

2,853,154

POCKET-TYPE AIR FILTERS

Richard D. Rivers, Louisville, Ky., assignor to American Air Filter Company, Inc., Louisville, Ky., a corporation of Delaware Application August 27, 1956, Serial No. 606,268

6 Claims. (Cl. 183—51)

This invention relates to an improved pocket-type air filter.

The Birkholz Patent #1,821,202, discloses a pocket-type air filter comprising a permanent partition extending across an air flow duct and having a plurality of uniformly spaced apertures, each receiving a removable and disposable air filtering pocket or sack. In order to renew the filtering media of this arrangement, each pocket must be individually removed and a new pocket inserted in its place.

The principal object of this invention is to provide a pocket-type air filter which is easier and less expensive to maintain.

Another important object is to provide a novel form of pocket-type filter wherein both the pockets and the pocket-supporting partition can be constructed of inexpensive disposable material and integrated into a single unit which can be renewed as a whole.

Other objects of this invention are: to provide a pocket-type air filter with self-supporting pockets; to provide one having a larger air filtering surface as compared to the overall size of the filter unit; to provide one having an improved pocket-shape which can be efficiently manufactured from sheet material with very little waste; and to provide a disposable pocket-type air filter and unit which can be collapsed into a substantially flat unit for shipment or storage.

These objects, broadly speaking, are achieved in a unit comprising: an opposed pair of plain or corrugated cardboard plates having aligned pocket-receiving apertures; a porous air filtering pocket for each aligned pair of apertures, each pocket projecting through an aperture in one plate from a perimetric mouth flange which extends between plates; and means securing said plates together to provide a frame which grips said flanges and supports said pockets, and integrates said frame and pockets into a unit which is disposable as a whole.

As will be obvious, this unit is composed of parts which are easy to make and easy to assemble into the finished product which, itself, can be easily and quickly placed in service and readily maintained, all at relatively low expense. Since it can be flattened into a compact package, it is easy and inexpensive to ship. When its useful life is over, it is a relatively simple matter to remove and discard it and to replace it with a like new unit.

The invention is illustrated in the accompanying drawing wherein.

Figure 2:
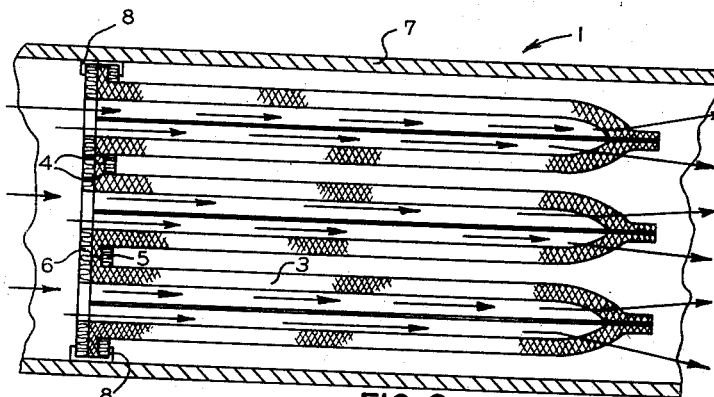
Fig. 2 is a longitudinal sectional view taken vertically through an air duct containing a pocket type filter of the character shown in Fig. 1.
Figure 1:
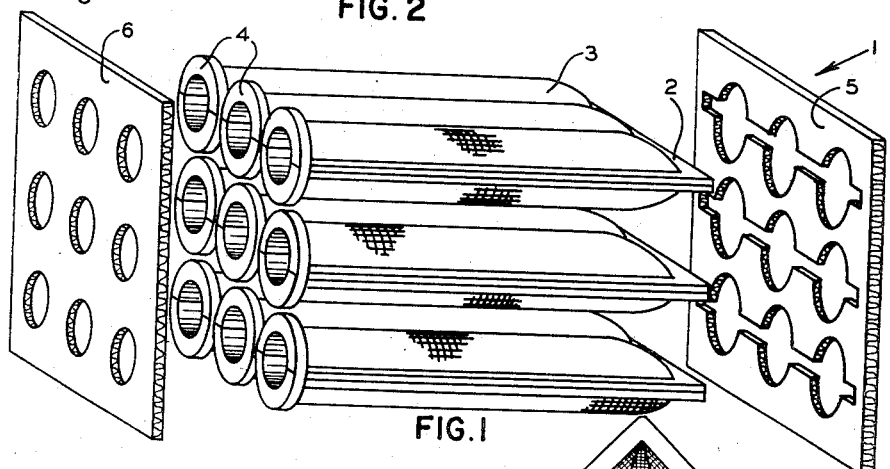
Fig. 1 is an exploded perspective view of an embodiment of my invention.

The air filtering unit, illustrated in Figs. 1 and 2, includes: pocket elements; plate elements; and securing means.

Each pocket element comprises a plurality of vertically-spaced horizontally-extending rows 2 of pockets, each row including several individual air filtering pockets 3. Each row 2 of pockets 3 is constructed by joining (e. g. stitching or gluing) together two sheets, composed of paper, glass or other suitable inexpensive air filtering fabric, not only along a U-shaped seam line extending from the upstream end horizontally first along one side edge or margin to the downstream end, next along the downstream end from one side edge to the other and thence along the other side edge back to the upstream end, but also along straight parallel intermediate lines corresponding to the side edge seams but lying between adjacent pockets. The free internal portions of the two sheets between the seams are expanded to form the cylindrical filter pockets 3, each of which has, along its upstream end, an open inlet end or mouth for receiving dust-laden air flowing usually under pressure. The sheet material adjacent the mouth of each pocket is turned to extend outwardly so as to form a pocket mounting flange 4.

The plate element comprises a pair of cardboard or other suitable plates 5 and 6. The downstream plate 5 has cutouts corresponding, in number, to the number of rows 2, and, in outline to the outline of the transverse periphery of a row. Each row is inserted within a cutout of plate 5 with the flanges 4 of the pockets engaging the adjacent and corresponding inner face portion of the plate 5.

Each cutout includes a plurality of horizontally spaced circular openings with horizontal slots extending not only between adjacent openings but also outwardly from each end opening of each row for a short distance. The horizontal slots allow the seam material, along and between pockets, to pass through the plate 5 as the pockets are inserted within the circular cutouts. The dimensions of the circular cutouts and the slots are arranged to conform to the external dimensions of the row 2 of pockets.

Each plate 6 has cutouts positioned and dimensioned to conform with the position and the internal dimension of each mouth of each pocket which is inserted in the cutouts of the other plate 5. The second plate 6 is superposed over the first plate 5 with the flanges 4 of each pocket interposed between the adjacent inner faces of the plates 5 and 6 as shown in Fig. 2.

The inner faces of the plates 5 and 6 are suitably secured together by adhesive or other suitable means to provide a frame which grips the pocket flanges and supports the pockets and, at the same time, to integrate said frame and pockets into a single unit which is disposable as a single unit. Preferably, the adhesive securing means also bonds the flanges 4 to the inner face of each plate.

Fig. 2 shows the filter unit 1 of Fig. 1 in position within an air duct 7 with dust-laden air flowing from the left to the right, the air entering the mouths of the pockets 3 and being filtered as it passes through the walls of the pockets from the inside to the outside. The filter unit 1 is supported and sealed within the air duct 7 by a pair of opposed channel bars 8 mounted on opposite walls of the duct.

The use of a flexible glue such as "Pliobond" to form the seams of the pockets 3 enables the pockets to be flattened, by pressing, rolling or folding them onto the supporting partition plates 5 and 6, into a compact package which facilitates shipping and storage.

Where the pockets are to be used under ordinary temperature conditions, they may very well be made of fiberglass material. If they are to be used under high temperature conditions, they can be composed of quartz or alumina fiber sheets. In this event, the plates 5 and 6 may be constructed of a suitable self-supporting high temperature refractory material.

Figure 3:
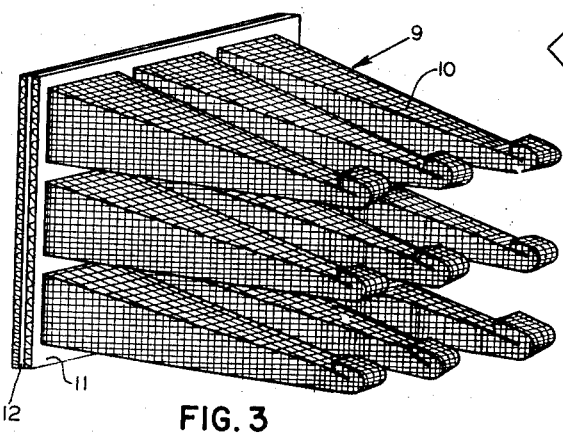
Fig. 3 is a perspecitve view of another embodiment of my invention.

The air filter unit 9 of Fig. 3 is similar to the unit 1, except that its pockets 10 are shaped in the form of an obelisk or a frustum of a square pyramid with the tips turned over and sealed, and they are not connected directly to each other in horizontal rows. Each of the pockets 10 include outwardly extending flanges, similar to the flanges 4 of the unit 1, surrounding the pocket mouths and adapted to be secured between a pair of supporting plates 11 and 12 similar to the plates 5 and 6 of Fig. 1 except for the necessarily different shape of the cut-outs in the plates.

The plate 11 is provided with a plurality of spaced cut-outs of square configuration and of a dimension to conform to the external dimension of each pocket 10 and the cutouts in the plate 12 are also correspondingly spaced and have a square configuration, but are dimensioned to conform to the internal shape of the mouth of each pocket 10. The plates 11 and 12 are suitably joined together to hold the mouth flanges of each pocket 10 between them in a manner similar to the filter unit 1 of Fig. 1.

Figure 4:
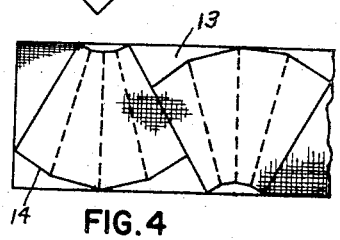
Fig. 4 is a developed plan view of a sheet of air filter material used to construct the pockets of Fig. 3.

Fig. 4 shows a sheet 13 of suitable air filtering sheet material, e. g. one composed of glass fiber, with solid lines 14 to illustrate how the pockets 10 of Fig. 3 can be cut with substantially little or no waste, the dotted lines illustrating the folding lines for each pocket.

Figure 5:
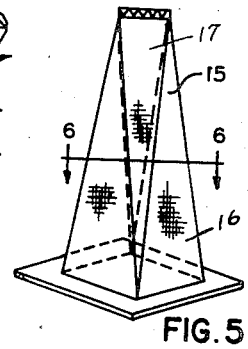
Fig. 5 is a perspective view of a modified Fig. 3 pocket.
Figure 6:
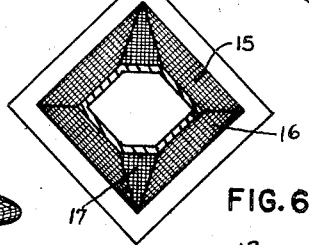
Fig. 6 is a section taken on lines 6—6 of Fig. 5.

Figs. 5 and 6 illustrates a modified individual pocket 15 which may be substituted for the pockets 10 of the filter unit 9 of Fig. 3. The pocket 15 has a square air inlet mouth and a body which tapers to a transverse closure line. The body is shaped to correspond to the frustum of a square pyramid except that two diagonally opposite corners are cut away to form a pair of diagonally opposite triangular openings, each of which points toward the open end of the pocket.

One of these triangular openings has its apex at one of the four square corners of the square inlet or mouth end of the pocket. The other, has its apex at the diagonally opposite corner of the square inlet end. Both openings flare, or increase in width, from the inlet end toward the closed end of the pocket until their respective major planes intersect each other to form a transverse line which extends, at the closed end, between the other two diagonally opposite corners of the body.

Each of these triangular openings is closed with a corresponding triangular section 17 of filtering material, the bases of which are joined along said transverse line to form a transverse closure line. The body of the pocket 15 thus includes: one triangular panel 16 of filter material folded, from its apex along a fold line bisecting its base, to form two right-angled side pieces arranged at right angles to each other, with their bases located at the inlet end of the pocket to provide two adjacent sides of the square inlet opening, with their common apex located at the closed end of the pocket to provide one end of the transverse closure line and with the right angle between them forming one of two diagonally opposite right angled corners of the pocket; another identical triangular panel 16 folded to form two more right angled side pieces, which, being replicas of the first, have their bases located at the large end of the pocket to provide the other two sides of the square inlet opening, their common apex, located at the closed end of the pocket to provide the other end of said transverse closure line and the right angle between them forming the other of the two diagonally opposite right angled corners of the pocket; the hypotenuse edge of each right angled side piece of one panel 16 being spaced, from the hypotenuse edge on the adjacent side piece of the other panel 16, to form a triangular opening therebetween which points toward the open end of the pocket with its base located at the closed end where it extends transversely along said transverse closure line; and a triangular piece 17 closing each triangular opening. The material adjacent the square mouth of the pocket is turned outwardly to provide mounting flanges similar to the flanges 4 of Fig. 1.

A filter unit employing pockets having square mouths such as shown in Figs. 3 and 5 can have a greater filtering capacity than the same size unit employing pockets having circular mouths.

Having described my invention, I claim:

1. An air filtering unit of the disposable pocket-type comprising: a first plate member having an inner face, an outer face and a plurality of air passage apertures therethrough; a second plate member having an inner face, an outer face, and a plurality of filter pocket receiving apertures therein, said first and second plate members being arranged with their inner faces opposing each other and with the pocket receiving apertures in said second plate member being selectively disposed in alignment with the air passage apertures in said first plate member; a plurality of filter pockets of porous air filtering material of a character permitting temporary deformation thereof, one for each pocket receiving aperture, each pocket having a body with an integral outwardly flanged mouth at one end, each pocket extending through a corresponding pocket receiving aperture in said second plate member with its body projecting from the outer face thereof and with its flange sandwiched between and in engagement with the inner faces of both plates; and means disposed intermediate said plate members securing the same together to provide a frame, which grips said flanges and supports said pockets, and to integrate said frame and pockets into a single unit which is disposable as a whole.

2. The air filter unit of claim 1 wherein: a plurality of said pockets are interconnected together along their lengths.

3. The air filter unit of claim 1 wherein: a plurality of said pockets are integrally connected together.

4. The air filter unit of claim 1 wherein: said pocket mouths are rectangular.

5. The air filter unit of claim 4 wherein: said pocket bodies have substantially pyramidal shapes.

6. The air filter unit of claim 1 wherein: said pockets can be flattened downwardly against said frame to provide a compact package.

References Cited in the file of this patent

UNITED STATES PATENTS

| | | |
|---|---|---|
| 1,821,202 | Birkholz | Sept. 1, 1931 |
| 1,924,249 | Marshall | Aug. 29, 1933 |
| 2,237,499 | Osterdahl | Apr. 8, 1941 |
| 2,774,443 | Slayter | Dec. 18, 1956 |

FOREIGN PATENTS

| | | |
|---|---|---|
| 575,846 | France | Apr. 30, 1924 |
| 1,083,663 | France | June 30, 1954 |